Patented Aug. 17, 1943

2,326,986

UNITED STATES PATENT OFFICE 2,326,986

PROCESS FOR THE PRODUCTION OF FUMARIC ACID

Selman A. Waksman, Highland Park, N. J., assignor, by direct and mesne assignments, of one-half to Merck & Co. Inc., Rahway, N. J., a corporation of New Jersey, and one-half to Chas. Pfizer & Co., Inc., Brooklyn, N. Y., a corporation of New Jersey No Drawing. Application July 1, 1939, Serial No. 282,423

18 Claims. (Cl. 195—36)

This invention relates to processes for the production of fumaric acid from various carbohydrates and carbohydrate-containing materials, by means of certain strains of fungi.

The production of fumaric acid by certain fungi, particularly by Rhizopus nigricans, is known. However, the reported yields were either variable or insufficient for the utilization of the processes for industrial purposes. These variations were due not only to a lack of a realization of the existence of a specific fungus capable of producing fumaric acid to the substantial exclusion of other acids but also to an insufficient recognition of the fact that an economic production of fumaric acid depends strictly on a knowledge of the physiology of the specific organism and on certain conditions of culture.

Though the importance of the specific strains of fungi, from a standpoint of merely a tendency to form fumaric acid, has hitherto been recognized, it has not been previously perceived that the ability to form fumaric acid is not a property characteristic of all strains of Rhizopus; that there is not only a quantitative difference but also a qualitative difference in acid-forming capacity between strains of Rhizopus; and that the various morphologically identical strains of Rhizopus nigricans, as well as the male and female races of even the same strain of this species, may differ strikingly in their acid-forming capacities.

I have now invented processes for the production of fumaric acid which give consistently high yields of fumaric acid under standardized specified conditions of fungal growth, treatment, and control.

My processes are carried out in two distinct ways—the one whereby the solution in which the fungal growth takes place is removed and is replaced by one or more solutions in which the fermentation for the production of fumaric acid predominates; the other whereby the growth of the fungus and the entire production of the fumaric acid take place in the same solution. Aseptic technique is practised throughout.

In my processes I preferably use certain selected strains of species of fungi belonging to the genus Rhizopus. These are strains of Rhizopus nigricans. These strains are selected as possessing in particular an abundance of the enzyme mechanism by which they are able, when suitably grown and treated according to my processes, to produce fumaric acid in industrially important quantities. However, though the abundant production of fumaric acid by fungi is limited largely to species of the genus Rhizopus and is even still further narrowed by economic considerations to certain strains of the species Rhizopus nigricans possessing a distinctive physiological specificity, I have found that other organisms belonging to the order Mucorales are also capable of forming fumaric acid in industrially important quantities according to my processes herein described.

The isolation and identification of the fumaric acid producing strain of Rhizopus nigricans can be accomplished as follows:

Various natural materials such as soil, decaying organic material, spoiled bread and other spoiled foodstuffs can be used as a source of the organism. This material is plated out on certain bacteriological media, especially those favorable to the development of fungi. The fungus medium of Waksman can be used for this purpose. This medium contains, per liter, 5 gms. peptone, 10 gms. glucose, 1 gm. $KH_2PO_4$, ½ gm. $MgSO_4.7H_2O$ and 25 gms. agar. The reaction of this medium is adjusted to pH 4.0. The medium is sterilized at 10 pounds pressure for 30 minutes. The natural material is plated out in this medium in various dilutions and allowed to incubate at 25° C. for a period of 2 to 3 days. The colonies of Rhizopus, which can easily be recognized by the trained observer, are then picked and transferred, either to the same medium in test tubes or to any other medium suitable for the growth of this fungus. Pure cultures are thus obtained. These cultures are now grown on liquid media having the composition and under the conditions outlined in this specification. The medium is tested for fumaric acid by known chemical methods after various intervals of incubation at 25° C. to 37° C. Those strains, which, under conditions comparable to those of my processes, give rapid and abundant growth and show a strong fumaric acid producing capacity, to the practical exclusion of undesirable acids, are selected for the purposes of my processes.

Suitable strains of other members of the Mucorales, such as certain species of Mucor, Cunninghamella, and Circinella, can be similarly selected. These strains and those of Rhizopus nigricans will be generally referred to as fumaric acid forming strains.

I have found that the carbohydrate:nitrogen ratio present in the nutrient culture medium is of great importance in the fumaric acid producing capacity of the described strains of Rhizopus nigricans as well as other Mucorales which were found to be capable of producing fumaric acid. In general the lower the carbohydrate:nitrogen ratio the more unfavorable are the conditions of fumaric acid accumulation, and conversely, up to a certain maximum, a higher ratio is more favorable for the conditions of fumaric acid accumulation. These carbohydrate (as carbon): nitrogen ratios have been ascertained to range between about 25:1 and 300:1, respectively. However, it has been found further that these conditions become considerably modified by the presence (or addition) of zinc ion to the medium so that in general this element greatly reduces the yields of fumaric acid especially during the period of active growth. This effect is much reduced at higher carbohydrate:nitrogen ratios, as described more fully later.

The most favorable sources of nitrogen have been found to be ammonium sulfate and other salts of ammonia, as well as urea and other compounds of nitrogen, though the influence of urea on fumaric acid formation is less favorable than that of ammonium sulfate.

As it is highly important to balance the nitrogen concentration in the culture medium, since an excessive amount of nitrogen will considerably delay the production of fumaric acid and will reduce or even prevent the yield of fumaric acid, I have determined that, for example, the presence of 200 mgs. to 500 mgs. of nitrogen per liter of medium containing 50 to 150 gms. of carbohydrate gives favorable results. Maximum mycelial growth is attained, accompanied and followed by the production of fumaric acid.

The other constituents of the basal medium, besides carbohydrate, as a source of carbon, comprise, in certain cases, to be described, nutrient mineral salts, and a neutralizing agent such as calcium carbonate.

These nutrient mineral salts are used by me in various combinations and concentrations, substantially the following representing a typical composition: $(NH_4)_2SO_4$, 0.2%; $MgSO_4.7H_2O$, 0.05%; $K_2HPO_4$, 0.5%. In the case of crude carbohydrate materials these required salt concentrations may be less.

I have further found that the presence of certain catalytic or trace elements in the culture medium markedly modifies the physiology of Rhizopus. These elements have a decided effect both upon the growth of the fungus and upon the production of fumaric acid.

Specifically, zinc has a decided stimulating effect upon mycelial growth of Rhizopus at the expense of the accumulation of fumaric acid, whereas iron has a decided stimulating effect upon the production of fumaric acid by Rhizopus with a repressive effect upon its mycelial growth.

It has also been found that it is necessary to balance the nutrient culture medium in such a way as to produce the optimum mycelial growth by accelerating such growth through the presence of zinc, so that this growth will be accompanied and immediately followed by the maximum formation of fumaric acid.

In attaining this balance, I add a salt of zinc, such as zinc sulfate, $ZnSO_4.7H_2O$, to the culture medium in concentrations of about 1 to 10 mgs. per liter of medium containing 50 to 150 gms. of carbohydrate, and balance the effect of the zinc with a salt of iron, such as ferric sulfate, $Fe_2(SO_4)_3$, in concentrations of about 1 to 20 mgs. per liter of medium containing 50 to 150 gms. of carbohydrate. Optimum conditions—insofar as they are inducible by these trace elements—are thus obtained for both the mycelial growth and the fumaric acid production steps, which will be described in the examples to follow.

It is to be emphasized that the stated amounts of zinc and iron salts may not all have to be added to the medium and that somewhat higher concentrations of zinc and iron salts are not eliminated by the figures here given. The minute amounts of these elements which are required render it quite likely that they may be contained in larger or smaller quantities as impurities in some or all of the other major constituents of the medium. The fact remains, however, that zinc and iron are important elements in my processes.

The stated amounts of these elements, zinc and iron, are intended to apply when chemically pure nutrient salts are used together with a crystalline carbohydrate of a high degree of purity.

Analyses of the materials for contents of zinc, iron, and other heavy metals, and supplementary additions thereof, if the contents of them are deficient, provide accurate control of the critical ratio of zinc to carbohydrate in the growth stage, as well as control of the factors involving the requirements of iron or other heavy metals.

I have found that up to 20 mgs. of $Fe_2(SO_4)_3$ per liter of culture solution, depending on the carbohydrate:nitrogen ratio, provides a satisfactory concentration of iron for the acid-forming capacity of my selected strains of Rhizopus.

It has further been found that, on the one hand, the associative nature, or, on the other hand, the antagonistic nature of these two trace elements, zinc and iron, depends on the ratio in which they are present in the culture medium, their associative nature being manifested when the zinc and the iron exist in a ratio of substantially 1 to 2 of their stated salts.

In addition to iron, trace amounts of maganese and copper may be introduced in order to accentuate the described specific effect of zinc. Such traces do not require such rigid control as do those of zinc and iron.

It is to be especially noted that the addition of zinc as well as maganese and copper and minute quantities of iron may be highly desirable in order to obtain as rapidly as possible an abundant mass of cell substance, especially when a pure carbohydrate is used. This cell substance would be formed without the simultaneous high yields of fumaric acid, since the presence of these heavy metals promotes the conversion of the carbon of the consumed carbohydrate into cell substance rather than allowing the carbon to accumulate in the form of fumaric acid. Such desirability depends upon the economic interest. Such addition may be particularly desirable when the mature growth substance is supplied with replacement sugar solutions. The cell substance will convert the sugar under such conditions into fumaric acid at a high rate. This procedure is described below.

Moreover, the carbohydrate concentration of the medium influences the intensity of the effects of zinc and iron, and I have determined that the net effect of zinc and iron on fumaric acid production is associative when the initial carbohydrate concentration of the medium is high (i. e. 20 to 30 percent), but that the net effect of zinc and iron on fumaric acid production is antagonistic when the initial carbohydrate concentration of the medium is low (i. e. below 20 per cent).

I have found that small amounts of certain inorganic salts, namely, phosphates, and sulfates, accelerate both the process of fumaric acid production and the yield of fumaric acid if these salts are added to the culture liquid during the second and later stages of the fumaric acid production step, and that they serve as efficiently as iron in this respect and may be substituted therefor. For purposes of this acid-forming acceleration I may therefore use instead of iron, for example, dipotassium phosphate, $K_2HPO_4$, and magnesium sulfate, $MgSO_4.7H_2O$, in concentrations of about 0.3 to 1 gm. each per liter of solution containing about 200 gms. of carbohydrate. Very small amounts of nitrogen may also be added.

I have further found that the mycelial mass of Rhizopus can produce free fumaric acid in large amounts even in the complete absence of a neutralizing agent. The free acid accumulates as such in the culture medium and eventually attains concentrations sufficient to crystallize out in the culture as free acid. This accumulation of fumaric acid has been found to lower the pH of the medium to about 2.4, at which point the crystallization of the acid occurs. The capacity of Rhizopus to produce fumaric acid at this high hydrogen ion concentration is noteworthy, as this pH range is much below that of the activity of most living systems.

However, the removal of the free fumaric acid, by its neutralization with calcium carbonate or other such agent, is decidedly conducive to an abundant mycelial growth especially in the presence of zinc. I, therefore, use a suitable neutralizing agent for this purpose as an essential step toward the attainment of optimum mycelial growth.

In view of the fact that an alkaline environment has a depressive effect on the germination of Rhizopus spores, calcium carbonate is added to the culture after mycelial growth has fairly well advanced, i. e., shortly after spore germination.

The accumulation of free acid soon tends to retard both the total amount and the rate of fumaric acid formation. Therefore, it is desirable to neutralize this acidity. I have found that calcium carbonate or magnesium carbonate serves very satisfactorily to neutralize this acid and results in a more rapid conversion of sugar to fumaric acid and at a higher rate. This is true during both the original growth phase and during the subsequent replacement phase. The nature of these phases will become evident from the examples to follow.

I have found further that the soluble calcium fumarate salt reaches a concentration which exceeds its solubility and it crystallizes out abundantly throughout the medium and throughout the cell mass until the whole culture presents a solid mass of crystalline material. Under these conditions the conversion of sugar to acid ceases. It is, therefore, desirable to neutralize the acid with alkalies whose fumarate salts are more soluble and hence would not crystallize so readily. I have found that KOH or NaOH can be used quite effectively to obviate this difficulty. Care should be exercised when using the soluble alkalies not to add enough to render the pH above 7.0. It is preferable to adjust the pH periodically at frequent intervals to approximately 5.0 to 6.5.

I have further found that I can readily substitute for pure sugar or other pure carbohydrate a cheap crude material, such as molasses or starch materials, even in the first or growth-phase of my processes. In this way, fumaric acid yields are sacrificed in order to obtain a rapid and abundant cell substance for use in the replacement phase.

Extensive experiments in respect to the use of submerged growths of Rhizopus have been made, and I have determined that the utilization of the fermentation processes by means of this fungus for fumaric acid production is industrially practicable.

Selected strains of *Rhizopus nigricans* can be grown rapidly and abundantly, in a submerged condition, in large containers corresponding to tank conditions, with the aid of rapid aeration or under air pressure and adequate agitation, with or without calcium carbonate or other neutralizing agents. The rate of growth under these conditions is greatly accelerated (twenty-four to forty-eight hours as compared to five to seven days for stationary surface growth) and the yields of fumaric acid obtained have practical importance. The advantages of a deep-tank fungus fermentation process over shallow-pan processes are obvious. The original nutrient culture solution may be drained off through the false bottom used for aeration or otherwise filtered off, leaving the mass of fungal mycelium in the container, which is then recharged with carbohydrate solution and, if desired, with calcium carbonate, or neutralized periodically with soluble alkalies. The fermentation of this replaced sugar by the preformed mycelium begins immediately at a high rate, resulting in considerable economy of time. The mass of fungal mycelium still possesses a high fermentation capacity through several sugar replacements although with gradually diminishing vigor.

If during submerged fermentation some interference with the process should tend to arise from the crystallization and the solidification of the culture solution as a result of the limited solubility of calcium fumarate, such interference can be readily overcome by the use of lower concentrations of carbohydrate in the replacement solutions, or by the use of soluble alkalies, such as KOH or NaOH.

The use of pure sugar solutions in submerged fermentation results in the occurrence of a product of a high degree of purity, and the relative insolubility of fumaric acid permits the liberation of the free fumaric acid directly from the culture solution merely by concentration and by addition of a mineral acid, such as $HNO_3$ or HCl.

The temperature optimum for mycelial growth, with complete disregard for acid production, is about 35° C. However, the optimum for fumaric acid production during the replacement phase is about 28° C. It is consequently advisable to conduct growth at about 28°–35° C.; fermentation is best conducted at about 28° C.

The maximum growth of the fungus can be empirically observed to have occurred by the extent of the proliferation; or it can be determined from the nitrogen consumed; or it can be roughly ascertained by the removal from the process container and the weighing of a given area of the pellicle in the case of stationary cultures, or by the removal of aliquot portions of the contents of the container and the weighing of the fungus material contained therein in the case of submerged growths.

The several successive process steps which I have found to be, by virtue of their specific combination and sequence, valuable for the successful and economic production of fumeric acid will now be described.

Example I

A culture solution, containing glucose or another carbohydrate or a mixture of carbohydrates, in concentrations of about 5 to 15 per cent total carbohydrate, is supplemented with the described nutrient salts and salts of catalytic or trace elements, and is sterilized by heat.

This culture solution is inoculated with a pure culture of selected strains of the fungus *Rhizopus nigricans*. Inoculation is effected by means of either the fungal spores or a predeveloped suspension of germinated spores, the latter resulting in considerable economy of time. The culture is incubated at about 28°–35° C.

In respect to the first stage, or growth phase, of this process, the culture is now allowed to grow either in a stationary manner, wherein a surface mass of growth or pellicle develops, or in a submerged condition, wherein the culture is gently agitated with air or with a mechanical stirrer, being held at atmospheric pressure or under increased air pressure, for 24 to 60 hours.

A lattice-like or other suitable support for the growing fungus is essential for the rapid development of an abundant mass of mycelial growth into a heavy pellicle in the stationary vessels, especially where a large surface area of liquid is to be covered by the growth. The lattice should preferably be approximately parallel to the liquid surface.

Calcium carbonate or other alkali is added to the culture liquid, stoichiometrically and aseptically, to neutralize the fumaric acid which the fungus has produced from the carbohydrate.

In stationary gowth tanks the liquid is agitated under the culture and care is taken not to injure the thin pellicle of growth which has formed on the surface.

The submerged culture is subjected to aeration either in rotating or in stationary tanks with air passing through the culture or under increased pressure.

When the growth of the fungus has reached its maximum at about 28°–35° C., which is usually within 2 to 7 days, depending on the relative concentration of the nutrient materials, trace elements and conditions of growth, such as temperature, the nutrient culture liquid in the containers in which growth has occurred is removed as completely as possible by drainage, by siphoning or by centrifuging.

This removed culture liquid contains the equivalent of about 10 to 45 per cent of fumaric acid on the basis of the carbohydrate consumed by the fungus, and this liquid is saved for the recovery of the fumaric acid therein.

The cell substance remaining in the containers (such substance being called "pellicles" in the case of the growths in stationary cultures) is then washed with sterile water to remove the last traces of nutrient salts, and this wash solution is drained off. This step is not essential for successful production of fumaric acid.

In respect to the second stage, or the replacement phase, of the process of fumaric acid production, the growth culture liquid is now substituted by the addition to the preformed cell substance of a solution of carbohydrate in concentrations containing up to about 20 per cent of carbohydrate, without supplementary nitrogen or other nutrient mineral salts. Simultaneously, calcium carbonate, substantially stoichiometrical to the anticipated fumaric acid yield, which may be up to about 50 per cent of the carbohydrate consumed by the fungus, is added to the fresh culture liquid, or neutralization is effected periodically by KOH or NaOH.

Accelerators of fumaric acid formation are also added at this step, for example: $Fe_2(SO_4)_3$ and $MgSO_4.7H_2O$, each in concentrations of 0.1 gm. to 1.0 gm. per liter of solution containing up to 20 per cent of carbohydrate.

The mass of fungal growth, which abundantly provides a strong enzyme mechanism for producing fumaric acid, is now allowed to act upon this carbohydrate solution for a period varying from 1 to 7 days, being aided by agitation and aeration or air pressure similar to that described.

The rates of growth and fumaric acid production are greatly accelerated by the presence of a surface support in the stationary cultures and by aeration, by air pressure and by agitation of the submerged type of growth.

Upon the initiation of the second stage the temperature is kept at about 28° C., which appears to be about optimum for fumaric acid production.

The culture solution is removed, as before, and the replacement of the carbohydrate by new solutions is repeated several times until the enzyme system of the Rhizopus mycelium is substantially exhausted.

The mature cell substance retains for some time its function as an enzyme system under these conditions, converting the carbohydrate and so continuing to produce fumaric acid with gradually reduced vigor, however, to the practically complete exclusion of other acids, from as many as three or four successive replacements with new carbohydrate solutions.

No vegetative growth, or very little, occurs in the replacement phase since nitrogen and other essential growth elements are lacking.

The addition of calcium carbonate or other neutralizing agent in the replacement phase is not absolutely essential in this process, because a substantially pure fumaric acid is formed and it crystallizes from the culture liquid owing to its low solubility. However, in order to bring about a high rate and an increased yield of fumaric acid formation, calcium carbonate or other neutralizing agents may be stoichiometrically added in this second stage.

Small amounts of other acids may be produced during both stages.

The final removal of the culture liquid containing calcium fumarate or other salts of fumaric acid and of the precipitated crystalline mass produced in the vessel completes the process. The fumaric acid is recovered as described.

Example II

The several steps of the first stage or growth phase, of the process described in Example I are followed, but the replacement of the culture medium solution by successive carbohydrate solutions, as described in the second stage of the process of Example I, is avoided by utilizing an excess of carbohydrate (such as 20 to 30 per cent) over nitrogen in the medium in its initial preparation. This excess of carbohydrate over nitrogen functions in the manner already stated. Aeration is effected as previously described.

Thus, this process is continuous up to the point of substantial enzyme-system exhaustion of the fungal mycelium.

As in Example I, the presence of calcium carbonate as a neutralizing agent is not essential, though it or other neutralizing agents may be used in substantially stoichiometrical proportions for the purpose of increasing the yield of fumaric acid.

As also in Example I, removal of the liquid from the substantially exhausted fungal mycelium and removal of the crystalline mass formed in the vessel complete the process.

*Example III*

The several successive steps of the first stage, or growth phase, of the process described in Example I are followed, except that a cheap crude carbohydrate-rich material, such as molasses or starch materials, is used in place of pure sugar and nutrient salts.

This crude material is diluted with water to afford a concentration from 5 to about 30 per cent of carbohydrate content, depending on the nature of the material, and, for reasons stated, it is supplemented with a nitrogen salt and a zinc salt, especially if these are lacking, as shown by analysis of the crude carbohydrate material. Excellent mycelial growth is produced on this medium.

As to the second stage of this process, this growth is now treated for the production of fumaric acid by the addition of a solution of sugar or other carbohydrate, in a concentration up to about 20 per cent of carbohydrate, as well as calcium carbonate or other neutralizing agent previously stated. An iron salt, and potassium phosphates and magnesium sulfate in proportions previously indicated may also be introduced. Aeration is effected as previously described.

By the introduction of pure sugar solutions in the second stage of this process, a fumaric acid of high purity can be obtained in each of several successive treatments of the mass of fungal mycelium, until the latter's acid-producing activity is substantially exhausted.

As in the process of Example I, the presence of calcium carbonate during the second stage is not essential, as enough slightly soluble fumaric acid goes into solution and attains concentration to crystallize from the culture liquid. A neutralizing agent may be used, however, to cause a considerably increased yield of fumaric acid.

As also in Example I, final removal of the liquid from the fungal mycelium and removal of the crystalline mass formed in the vessel complete the process.

References made herein to "various carbohydrates and carbohydrate-containing materials," "other pure carbohydrate," "solution of carbohydrate," "carbohydrate-rich material," and all expressions concerning the use of carbohydrate or carbohydrates in these processes, relate to glucose, or sucrose, or starch, or a mixture of these carbohydrates, or materials containing them, in solution or suspension.

These examples are given by way of illustration and not of limitation, as it is obvious that certain modifications may be made in the steps of these processes, and in the kinds and proportions of the materials employed, without departing from the spirit and scope of the invention and the purview of the claims.

I claim:

1. Process for the production of fumaric acid from fermentable carbohydrates selected from the group consisting of monosaccharides, starch, and materials containing these carbohydrates by means of a fumaric-acid-producing strains of species of a genus of the order Mucorales, which comprises the successive steps of inoculating a carbohydrate solution containing nutrient materials with the said strains, developing maximum fungal growth in the presence of a zinc salt at a temperature range of approximately 28° to 35° C., removing the nutrient culture solution, supplying the developed mycelium with a fresh carbohydrate solution in the presence of an iron salt, adding a neutralizing agent in sufficient quantity to raise the pH value to about 5–6.5, and conducting the fermentation at about 28° C. to substantial completion.

2. Process for the production of fumaric acid from fermentable carbohydrates selected from the group consisting of monosaccharides, starch, and materials containing these carbohydrates by means of Rhizopus, which comprises the successive steps of inoculating a carbohydrate solution containing nutrient materials with fumaric acid producing strains of Rhizopus, developing maximum fungal growth in the presence of a zinc salt at a temperature range of approximately 28° to 35° C., removing the nutrient culture solution, supplying the developed mycelium with a fresh carbohydrate solution in the presence of an iron salt, adding a neutralizing agent in sufficient quantity to raise the pH value to about 5–6.5, and conducting the fermentation at about 28° C. to substantial completion.

3. Process for the production of fumaric acid from fermentable carbohydrates selected from the group consisting of monosaccharides, starch, and materials containing these carbohydrates by means of *Rhizopus nigricans,* which comprises the successive steps of inoculating a carbohydrate solution containing nutrient materials with fumaric acid producing strains of *Rhizopus nigricans,* developing maximum fungal growth in the presence of a zinc salt at a temperature range of approximately 28° to 35° C., removing the nutrient culture solution, supplying the developed mycelium with a fresh carbohydrate solution in the presence of an iron salt, adding a neutralizing agent in sufficient quantity to raise the pH value to about 5–6.5, and conducting the fermentation at about 28° C. to substantial completion.

4. Process for the production of fumaric acid by fungal fermentation of carbohydrate material, comprising successive steps of preparing a culture solution of fermentable carbohydrates selected from the group consisting of monosaccharides, starch, and materials containing these carbohydrates in concentrations up to about 5 to 15 per cent total carbohydrate, supplementing such culture solution with nutrient salts and salts of members of the group consisting of manganese, copper and zinc, sterilizing said culture solution by heat, inoculating the sterile culture solution with a pure culture of fumaric-acid-producing strains of species of a genus of the order Mucorales, incubating the resulting inoculated culture solution from about 24 to 60 hours at about 28° to 35° C. until maximum mycelial growth has been attained, meanwhile supplying air under gentle agitation at not less than atmospheric pressure, adding an alkaline agent to neutralize the formed acid and to favor fungal growth, removing the culture solution from the container when fungal growth has reached the optimum growth of mycelium, adding to the fungal growth a solution of carbohydrate in concentrations containing up to about 20 per cent of carbohydrate and a neutralizing agent, all in the presence of phosphates and sulfates, allowing the mass of fungal growth to act upon the said renewed carbohydrate solution for a period varying from 1 to 7 days at about 28 C., removing the culture solution and replacing it by successive fresh solutions of carbohydrate material until the fumaric acid forming capacity of the fungal growth is substantially exhausted.

5. Process described in claim 4, with the following modifications: utilizing an excess of fermentable carbohydrate selected from the group consisting of monosaccharides, starch, and materials containing these carbohydrates, over nitrogen in the medium in its initial preparation, whereby the replacement of the culture medium solution by successive carbohydrate solutions is avoided and whereby the process of fumaric acid formation is continuous up to the point of substantial enzyme system exhaustion of the mycelial growth.

6. Process described in claim 4, with the following modifications: substituting crude for pure fermentable carbohydrates selected from the group consisting of monosaccharides, starch, and materials containing these carbohydrates and nutrient salts, diluting such crude material with water, supplementing such solution with a nitrogen salt and a zinc salt, developing substantially maximum fungal growth on this medium, treating this growth for the production of fumaric acid by the addition of a solution of fermentable carbohydrates selected from the group consisting of monosaccharides, starch, and materials containing these carbohydrates in a concentration up to about 20 per cent of carbohydrate.

7. In a process for the production of fumaric acid from fermentable carbohydrates selected from the group consisting of monosaccharides, starch, and materials containing these carbohydrates by means of a fumaric-acid-producing strains of a species of a genus of the order Mucorales, involving the operations of preparing a carbohydrate solution containing nutrient materials and inoculating such solution with such fungi, according to claim 1, the added step which consists in growing the fungi in a submerged condition in deep culture tanks.

8. In a process for the production of fumaric acid from fermentable carbohydrates selected from the group consisting of monosaccharides, starch, and materials containing these carbohydrates by means of fumaric-acid-producing strains of species of a genus of the order Mucorales, involving the operations of preparing a carbohydrate solution containing nutrient elements and inoculating such solution with such strains, the step which consists in balancing the nitrogen concentrations in the culture medium so that it will contain substantially 200 mgs. to 500 mgs. of nitrogen per litre of medium containing 50 to 150 gms. of carbohydrate.

9. In a process for the production of fumaric acid from fermentable carbohydrates selected from the group consisting of monosaccharides, starch, and materials containing these carbohydrates by means of fumaric-acid-producing strains of species of a genus of the order Mucorales, involving the operations of preparing a carbohydrate solution containing nutrient elements and inoculating such solution with such strains, the step which consists in adding to the culture medium a zinc salt in substantially the concentrations represented by 1 to 10 mgs. of $ZnSO_4.7H_2O$ per litre of medium containing 50 to 150 gms. of carbohydrate, whereby mycelial growth is stimulated.

10. In a process for the production of fumaric acid from fermentable carbohydrates selected from the group consisting of monosaccharides, starch, and materials containing these carbohydrates by means of fumaric-acid-producing strains of species of a genus of the order Mucaroles, involving the operations of preparing a carbohydrate solution containing nutrient elements together with zinc salt and inoculating such solution with such strains, the step which consists in adding to the culture medium an iron salt in substantially the concentrations represented by 1 to 20 mgs. of $Fe_2(SO_4)_3$ per litre of medium containing 50 to 150 gms. of carbohydrate, whereby an associative balanced concentration of iron and zinc salts is attained, and whereby fumaric acid formation is stimulated.

11. In a process for the production of fumaric acid from fermentable carbohydrates selected from the group consisting of monosaccharides, starch, and materials containing these carbohydrates by means of fumaric-acid-producing strains of species of a genus of the order Mucorales, involving the operations of preparing a carbohydrate solution containing nutrient elements together with zinc and iron salts and inoculating such solution with such strains, the step which consists in balancing the initial carbohydrate concentration of the medium by providing a carbohydrate content of 20 to 30 per cent, whereby the net effect of the zinc and the iron is associative in the medium in concentrations substantially represented by the relation of 1 to 10 mgs. of $ZnSO_4.7H_2O$ to 1 to 20 mgs. of $Fe_2(SO_4)_3$ per litre of medium.

12. In a process for the production of fumaric acid from fermentable carbohydrates selected selected from the group consisting of monosaccharides, starch, and materials containing these carbohydrates by means of fumaric-acid-producing strains of species of a genus of the order Mucorales, involving the operations of preparing a carbohydrate solution containing nutrient elements together with zinc salt and inoculating such solution with such strains, the step which consists in adding to the culture medium phosphates and sulfates in substantially the typical concentrations of about 0.3 to 1 gm. of dipotassium phosphate, $K_2HPO_4$, and about 0.3 to 1 gm. of magnesium sulfate, $MgSO_4.7H_2O$, per litre of solution containing about 200 gms. of carbohydrate, whereby the effect of zinc is neutralized and fumaric acid formation is stimulated.

13. In a process for the production of fumaric acid from fermentable carbohydrates selected from the group consisting of monosaccharides, starch, and materials containing these carbohydrates by means of fumaric-acid-producing strains of species of a genus of the order Mucorales, involving the operations of preparing a carbohydrate solution containing nutrient elements and inoculating such solution with such strains, the step which consists in partially neutralizing the formed fumaric acid with alkalies, whose fumarate salts are more soluble than calcium fumarate, to a pH range of about 5.0 to 6.5, whereby the process of fermentation is not hindered by the occurrence of a solid mass of crystalline material within the container.

14. Process for the production of fumaric acid from fermentable carbohydrates selected from the group consisting of monosaccharides, starch, and materials containing these carbohydrates, by means of fumaric-acid-producing strains of species of a genus of the order Mucorales, which comprises the successive steps of inoculating such a carbohydrate solution containing nutrient materials with the said strains, developing fungal growth in a submerged condition in the culture solution at not less than atmospheric pressure in the presence of a zinc salt at a temperature range of approximately 28° to 35° C., meanwhile subjecting the nutrient culture solution to aeration, removing that solution, supplying the residual fungal mycelium with a fresh solution of such carbohydrate in the presence of an iron salt, conducting the fermentation at about 28° C. to substantial completion, and meanwhile subjecting the renewed solution to similar aeration.

15. Process for the production of fumaric acid from fermentable carbohydrates selected from the group consisting of monosaccharides, starch, and materials containing these carbohydrates by means of Cunninghamella, which comprises the successive steps of inoculating a carbohydrate solution containing nutrient materials with fumaric-acid-producing strains of Cunninghamella, developing maximum fungal growth in the presence of a zinc salt at a temperature range of approximately 28° to 35° C., removing the nutrient culture solution, supplying the developed mycelium with a fresh carbohydrate solution in the presence of an iron salt, adding a neutralizing agent in sufficient quantity to raise the pH value to about 5–6.5, and conducting the fermentation at about 28° C. to substantial completion.

16. Process for the production of fumaric acid from fermentable carbohydrates selected from the group consisting of monosaccharides, starch, and materials containing these carbohydrates by means of Circinella, which comprises the successive steps of inoculating a carbohydrate solution containing nutrient materials with fumaric-acid-producing strains of Circinella, developing maximum fungal growth in the presence of a zinc salt at a temperature range of approximately 28° to 35° C., removing the nutrient culture solution, supplying the developed mycelium with a fresh carbohydrate solution in the presence of an iron salt, adding a neutralizing agent in sufficient quantity to raise the pH value to about 5–6.5, and conducting the fermentation at about 28° C. to substantial completion.

17. Process for the production of fumaric acid from fermentable carbohydrates selected from the group consisting of monosaccharides, starch, and materials containing these carbohydrates by means of fumaric-acid-producing strains of species of a genus of the order Mucorales, which comprises the successive steps of inoculating a carbohydrate solution containing nutrient materials with the said strains, developing fungal growth in the presence of a zinc salt, removing the nutrient culture solution, and supplying the developed mycelium with a fresh carbohydrate solution in the presence of an iron salt.

18. Process for the production of fumaric acid from fermentable carbohydrates selected from the group consisting of monosaccharides, starch, and materials containing these carbohydrates, by means of fumaric-acid-producing strains of species of a genus of the order Mucorales, which comprises the steps of inoculating such a carbohydrate solution containing nutrient materials with the said strains, developing fungal growth in a submerged condition in the culture solution in the presence of a zinc salt, meanwhile subjecting the culture solution to aeration, removing that solution, supplying the residual fungal mycelium with a fresh solution of such carbohydrate in the presence of an iron salt, and meanwhile subjecting the renewed solution to similar aeration.

SELMAN A. WAKSMAN.

CERTIFICATE OF CORRECTION.

Patent No. 2,326,986. August 17, 1943.

SELMAN A. WAKSMAN.

It is hereby certified that error appears in the printed specification of the above numbered patent requiring correction as follows: Page 2, first column, line 44, for "0.5%" read --0.05%--; and second column, line 26, for "or" before "other" read --and--; lines 41 and 47, for "maganese" read --manganese--; page 4, first column, line 1, for "fumeric" read --fumaric--; line 37, for "gowth" read --growth--; page 5, second column, line 2, claim 1, strike out "a" before "fumaric-acid-producing"; line 45, claim 3, for "nycelium" read --mycelium--; page 6, first column, line 41, claim 7, strike out "a" before "fumaric-acid-producing"; and second column, line 9, claim 10, for "Mucaroles" read --Mucorales--; line 40, claim 12, strike out "selected"; and that the said Letters Patent should be read with this correction therein that the same may conform to the record of the case in the Patent Office.

Signed and sealed this 16th day of November, A. D. 1943.

(Seal)

Henry Van Arsdale,
Acting Commissioner of Patents.